Patented June 14, 1927.

1,632,404

UNITED STATES PATENT OFFICE.

JAMES THOMAS GRIFFIN, OF OAK PARK, ILLINOIS, ASSIGNOR TO WESTERN ELECTRIC COMPANY, INCORPORATED, OF NEW YORK, N. Y., A CORPORATION OF NEW YORK.

CEMENTING MATERIAL.

No Drawing.   Application filed September 12, 1922.   Serial No. 587,673.

This invention relates to improvements in cementing materials.

A composition made in accordance with the present invention may be used to advantage as a cement for securing a carbon part to a porcelain part, such as in the assembly of protector blocks of the types disclosed in U. S. Patents 1,324,334, dated Dec. 9, 1919, and 1,406,681, dated Feb. 14, 1922.

An object of the invention is to provide a cementing material in such form that it may be readily utilized and which has a low melting point.

To attain this object and others, a cementing material made in accordance with the present invention comprises a granulated vitreous material and a volatile binder compressed to form a tablet.

Where this composition is used in the assembly of protector blocks, the tablet is placed adjacent a point where the joint is to be made between the electrode and the nonconducting block, these parts then being heated in a muffle furnace, or by other suitable means, to a temperature sufficient to cause a volatilization of the binder and a softening of the vitreous material to cause it to adhere to the electrode and block.

The cementing material in its preferred form may be made by mixing granulated lead borate glass and powdered naphthalene in proportions of approximately 16 parts lead borate glass to one part powdered naphthalene and then compressing the material into small tablets. The lead borate glass consists of approximately 85% lead oxide and 15% boric acid. Naphthalene is preferably selected as the volatilizing binder for the reason that when the lead borate glass is heated to soften it for effecting a union between the carbon electrode and porcelain block, the naphthalene will be completely volatilized, leaving no trace in the lead borate glass. It is found that any impurities in the lead borate glass will affect to some degree the electrical characteristics of the protector.

What is claimed is:

1. A cementing material in tablet form composed of granulated lead borate glass and sufficient naphthalene to cause the coherence of the lead borate glass.

2. A cementing material in tablet form composed of granulated lead borate glass comprising 85% lead oxide and 15% boric acid, and a binder of naphthalene.

3. A cementing material in tablet form composed of approximately 16 parts of lead borate glass and one part naphthalene.

4. A cementing material for joining ceramic articles, consisting of granulated lead borate glass held in tablet form by naphthalene.

In witness whereof, I hereunto subscribe my name this 30th day of August A. D., 1922.

JAMES THOMAS GRIFFIN.